Patented June 22, 1926.

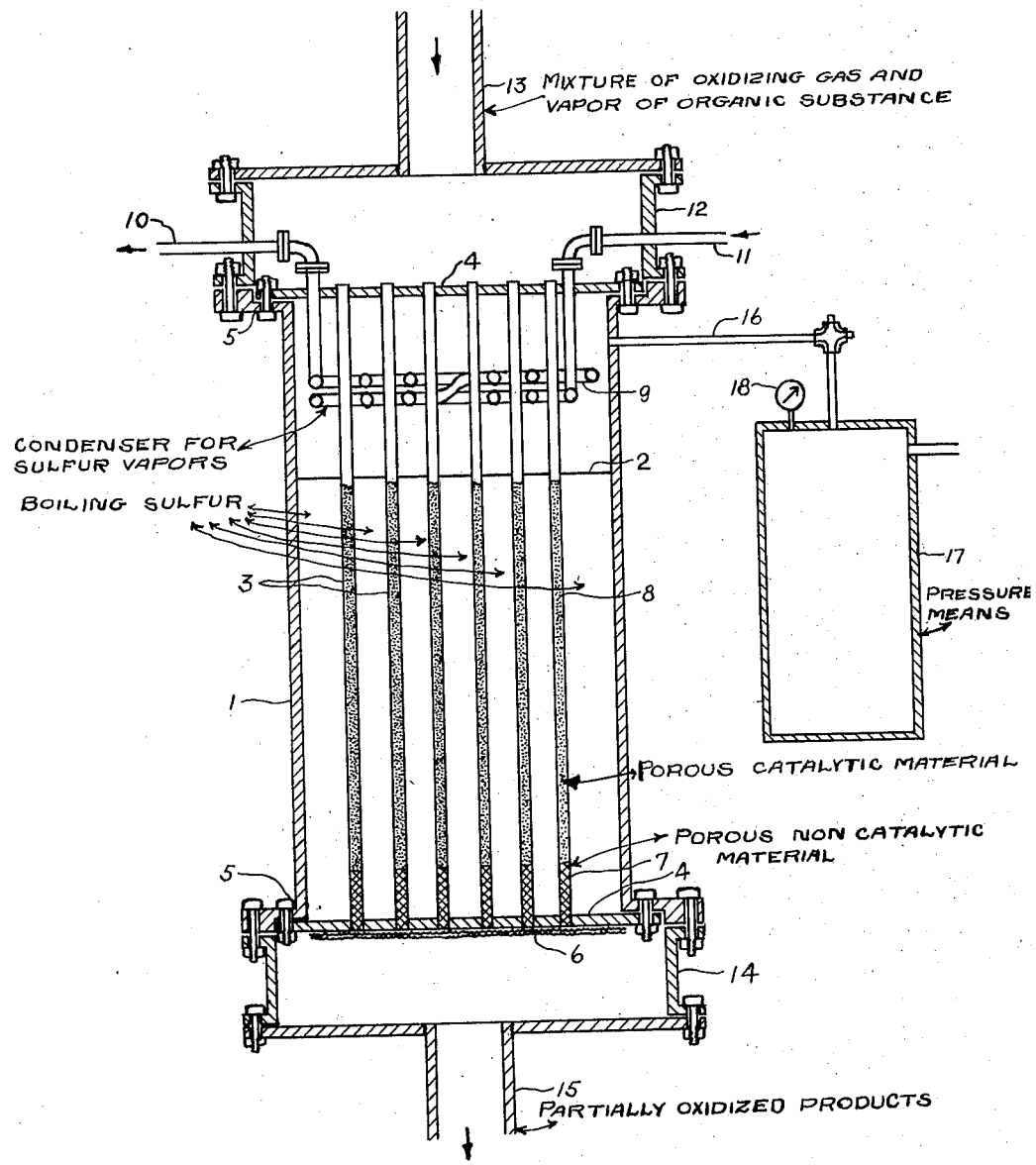

1,589,632

UNITED STATES PATENT OFFICE.

CHARLES RAYMOND DOWNS, OF NEW HAVEN, CONNECTICUT.

PROCESS FOR THE CATALYTIC OXIDATION OF ORGANIC COMPOUNDS.

Application filed January 21, 1924. Serial No. 687,441.

This invention relates to an improvement in the process of producing partial oxidation products of organic compounds by the catalytic oxidation of these compounds in the vapor phase with an oxygen containing gas. In such reactions it is necessary to maintain the temperature of the catalyst and reacting gases within a narrow range of temperature in order to produce the best results and as the oxidation reaction is highly exothermic, the heat evolved must be removed as formed in order to maintain the desired uniform temperature. I accomplish this by providing sulphur which can boil in heat transferring relationship to the catalyst and reacting gases, and by regulating the pressure on the sulphur system, I maintain automatically the temperature conditions more nearly constant as is desired.

In the past I have suggested and used boiling mercury for a similar purpose with satisfactory results. Mercury, however, has certain disadvantages when used in this way, namely, that its vapors, although odorless, are very poisonous to the human system, short exposures resulting in serious poisoning or death; further, on a volume basis, due to its high density and price, it is very costly and consequently, slight leaks in the apparatus in which the process is carried out result in industrial hazards and large financial losses.

I have found that sulphur is superior to mercury in these respects in that it is cheap, costing on a volume basis 1/500 as much as mercury, and, further, leaks are readily detected. As in the case of mercury, the boiling point of sulphur can be varied over relatively wide limits by the application of the proper absolute pressure to the system in which the sulphur is contained. Under atmospheric pressure, it boils at 444.6° C., or about 87° above the boiling point of mercury under like pressure. Since many catalytic oxidation reactions proceed most favorably at 400° C. or above, the pressure on the system necessary when using sulphur is materially less than when mercury is employed. This means that with sulphur at a given temperature in the general range mentioned, the construction of the apparatus in which the process is carried out can be lighter because the absolute pressures are less and the danger of leakage can therefore be reduced.

It will thus be seen that sulphur possesses certain important advantages for use in these processes.

The invention will be described and illustrated in connection with apparatus in which a reaction mixture in gaseous form is brought into contact with a catalyst, in heat transferring relationship with which is maintained boiling sulphur, combined with means for condensing the vaporized sulphur and returning the condensed liquid and means for controlling the pressure on the sulphur system. It is to be understood that the particular apparatus shown is only to illustrate the process and the invention is not restricted to the particular apparatus shown, nor to any specific material or materials of construction mentioned.

The drawing represents a vertical section through a form of apparatus suitable for carrying out the process. Numeral 1 represents a shell to contain the sulphur whose upper level is shown at 2. The tubes 3 are sealed into the tube sheets 4 by joints which are tight against differential pressures. The tube sheets 4 are also sealed tightly to the shell 1 around the circumference at the points 5. A screen or perforated plate 6 is supported by means not shown so that it is in contact with the bottom of the tubes 3. The tubes are partially filled with a porous non-catalytic material 7 resting on the screen 6 and above this the catalyst 8 whose upper level is slightly below the sulphur level 2 is located. The tubes above the catalyst may be either empty or filled with a porous non-catalytic mass. A cooling and condensing means 9 with inlet 10 and outlet 11 is provided at the top of the chamber by means of which the vaporized sulphur may be condensed and returned to the body of liquid sulphur. A top section 12 with vapor inlet 13 and a bottom section 14 with vapor outlet 15 are attached to the tube shell 1. A pipe 16 leads from the sulphur system above the liquid level to a pressure tank 17 with manometer 18 and means, not shown, for maintaining a constant pressure of a neutral gas on the sulphur system. All parts of the apparatus which come into contact with the sulphur should be constructed of aluminum or other homogeneous metal or alloy or a coated metal which is resistant to the action of boiling sulphur or sulphur vapor.

A horizontal section of the converter and tubes is not shown but this may be rectangular or circular or it may have any other suitable form. The condensing means 9 may be a spiral pipe coil as shown or any other suitable form known to the art. The tubes 3 may be welded into the tube sheets 4 or may be sealed to them by other means. The tubes containing the catalyst may be circular, rectangular or any other form in their cross-section. The tube sheets 4 may be bolted, riveted or welded to the shell 1. Other forms of condensers for the sulphur vapor may be used wherein the vapors are led outside the shell 1, there condensed, and the liquid sulphur returned to the shell 1.

As an example of operation I will describe the production of benzaldehyde from toluene. The catalyst may be a catalyst consisting in whole or in part of an oxide of molybdenum. The apparatus is closed and the sulphur heated to boiling by means not shown and the pressure on the sulphur system regulated to the desired point, say to maintain a catalyst temperature of 525° C. A mixture of toluene vapors and air is then passed into the inlet 13, is preheated in the upper part of the tubes 3 by the refluxing of the sulphur vapor. The preheated vapors then meet the catalyst 8, reaction takes place and heat is generated. This heat is transferred by radiation, convection and conduction to the sulphur, causing it to boil and thereby removing the heat as latent heat of vaporization without change of temperature. The products of reaction pass out at 15 to suitable condensing and recovery means. After the reaction is established the supply of outside heat may be discontinued as the operation is thermally self-sustaining. Any sulphur vapor not condensed in preheating the entering gases is condensed by the condenser 9 and is returned to the liquid sulphur for re-use.

The invention is applicable in general to the catalytic oxidation of organic compounds by an oxygen containing gas in the vapor phase to products of partial oxidation such as the production of phthalic anhydride from naphthalene, anthraquinone from anthracene and maleic anhydride from benzene.

Having thus described and particularized my invention, I claim:

1. In the production of partial oxidation products of organic compounds in the vapor phase with an oxygen containing gas in the presence of a catalyst, the step which comprises regulating the temperature of the catalyst and reacting gases by removing the heat of reaction by the vaporization of sulphur, distributed within the zone of reaction out of direct contact with the catalyst but in heat conducting relationship thereto.

2. In the production of benzaldehyde by the oxidation of toluene in the vapor phase with an oxygen containing gas in the presence of a catalyst, the step which comprises regulating the temperature of the catalyst and reacting gases by removing the heat of reaction by the vaporization of sulphur, distributed within the zone of reaction out of direct contact with the catalyst but in heat conducting relationship thereto.

3. In the production of partial oxidation products of organic compounds in the vapor phase with an oxygen containing gas in the presence of a catalyst, the step which comprises regulating the temperature of the catalyst and reacting gases by removing the heat of reaction by the vaporization of sulphur distributed within the zone of reaction out of direct contact with the catalyst, but in heat transferring relationship thereto, the temperature at which the sulphur boils being controlled by the pressure applied to it.

4. In the production of benzaldehyde by the oxidation of toluene in the vapor phase with an oxygen containing gas in the presence of a catalyst, the step which comprises regulating the temperature of the catalyst and reacting gases by removing the heat of reaction by the vaporization of sulphur distributed within the zone of reaction out of direct contact with the catalyst, but in heat transferring relationship thereto, the temperature at which the sulphur boils being controlled by the pressure applied to it.

In testimony whereof, I hereby affix my signature.

CHARLES RAYMOND DOWNS.